UNITED STATES PATENT OFFICE.

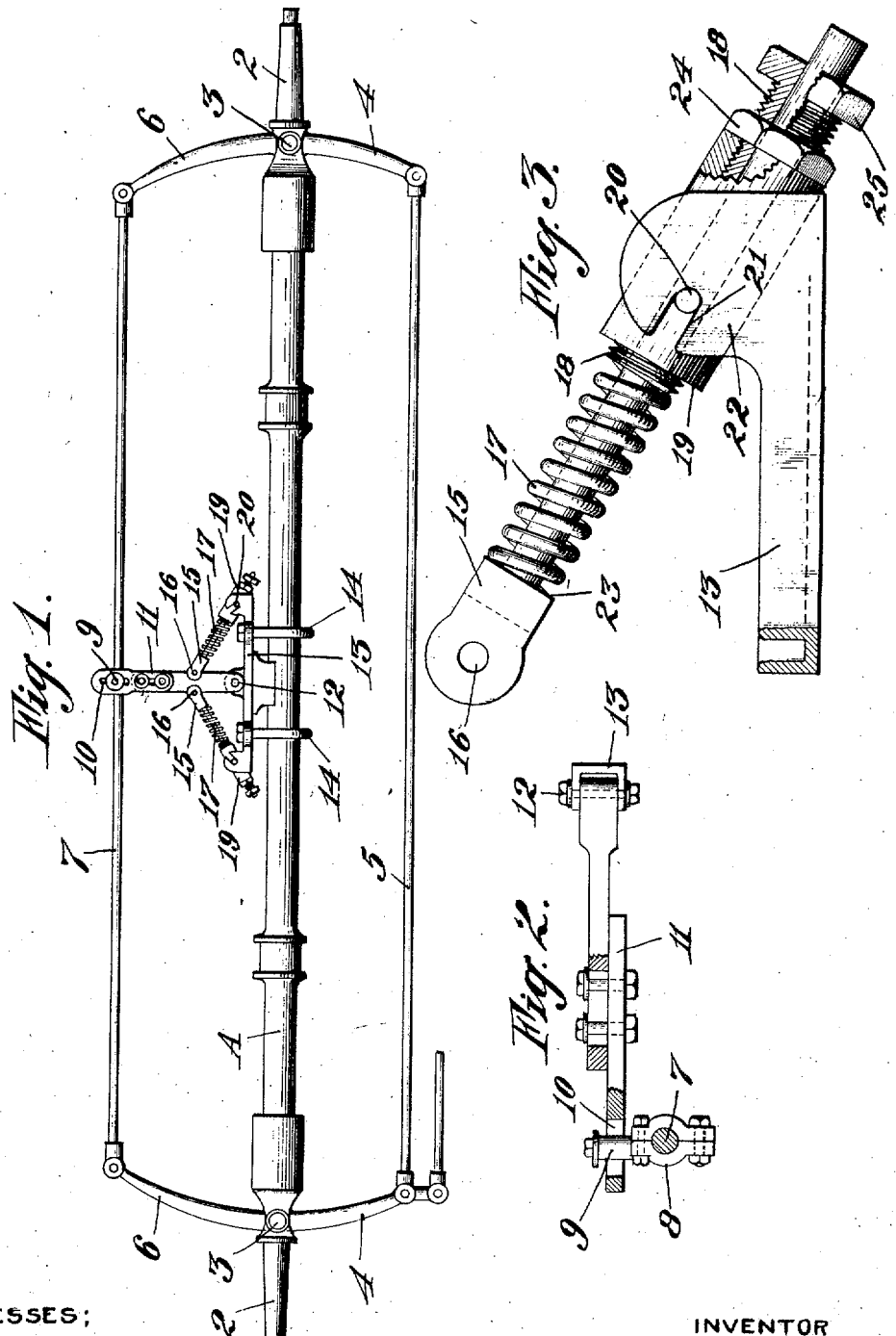

HENRY P. LAROUETTE, OF SAN JOSE, CALIFORNIA, ASSIGNOR OF ONE-EIGHTH TO ARTHUR L. WOOD, ONE-EIGHTH TO GEORGE L. BARKER, AND ONE-EIGHTH TO ALLEN J. MOAN, ALL OF SAN JOSE, CALIFORNIA.

SAFETY STEERING ATTACHMENT.

954,979. Specification of Letters Patent. Patented Apr. 12, 1910.

Application filed July 7, 1909. Serial No. 506,410.

*To all whom it may concern:*

Be it known that I, HENRY P. LAROUETTE, citizen of the United States, residing at San Jose, in the county of Santa Clara and State of California, have invented new and useful Improvements in Safety Steering Attachments, of which the following is a specification.

This invention relates to a safety appliance for use with automobiles and the like, for maintaining the front steering wheels normally parallel with the longitudinal axis of the machine, at the same time permitting the wheels to be turned by the steering gear.

The object of the invention is to provide a simple, cheap, practical attachment which will tend to avoid accidents resulting from defects or breakages in the steering gear, and which attachment is simple of application to any vehicle already in use.

The invention consists of the parts and the construction and combination of parts as hereinafter more fully described and claimed, having reference to the accompanying drawings, in which—

Figure 1 is a plan view of the invention. Fig. 2 is a sectional detail. Fig. 3 is a detail of the cushion member.

A is the front axle of an automobile or other vehicle to which the invention may be applied, 2 are the steering knuckles pivoted to the axle at 3 and having the steering arms 4 connected by a rod 5. Simultaneous steering action of the knuckles and of the wheels which are carried by the knuckles 2 is effected from the steering wheel through the rod 5 and the usual steering gear, not here shown.

6 is a rigid arm secured to each steering knuckle, and 7 is a rod connecting the two arms 6. This rod is gripped centrally by a split clamp collar 8 which is provided with an anti-friction roller 9 adapted to work in a slot 10 in an adjustable arm 11, which latter is fulcrumed at 12 to a bracket 13; this bracket 13 being secured centrally to the axle A by suitable means, as the U-bolts 14.

Rods 15 are pivoted to opposite sides of the adjustable arm 11 at any suitable point between the ends of the arm, as shown at 16, these rods 15 having a reduced portion surrounded by a spring 17, each rod having a free sliding movement in the externally threaded sleeve 18, which latter screws into a tubular trunnion member 19 pivoted at 20 in the bottom of the slot 21 formed in the ears 22 at the end of the bracket 13; the spring 17 having the one end abutting against the upper end of the threaded sleeve 18, and the other end abutting against the shoulder 23 on the rod. The tension of the two springs 17 is adjusted by suitably turning the nuts 18 so that the arm 11 will normally stand at right angles to the axle A so as to maintain the wheels straight ahead, or parallel with the length of the machine. The result is that if anything goes wrong with the steering gear, these springs 17, by reason of the yielding pivotal action of the brace rods 15, will maintain the course of the vehicle in a straight line, and therefore tend to lessen the danger of accidents by the overturning of the vehicle. After the springs 17 are once adjusted, the sleeve 18 is locked in position by the set nut 24; the turning of the sleeve being effected by the formation of a suitable polygonal head thereon, as shown at 25.

The adjustable arm 11 and the bracket 13 which can be clamped at any angle to the axle enables the device to be applied to different makes of machine without difficulty.

Having thus described my invention, what I claim and desire to secure by Letters Patent is—

1. The combination with a vehicle axle, of steering knuckles turnable thereon, arms rigid with the knuckles, a rod pivotally connecting them, an arm pivotally supported on the axle between said rigid arms, pivotal connections between said pivoted arm and said connecting rod, and a pair of spring supported slidably mounted brace members connected to the pivoted arm to maintain it normally at right angles to the axle.

2. The combination with a vehicle axle, of steering knuckles turnable thereon, arms rigid with the knuckles, a rod pivotally connecting them, an arm pivotally supported on the axle between said rigid arms, pivotal connections between said pivoted arm and said connecting rod, and means acting on the pivoted arm to maintain it normally at right angles to the axle, said last-named means comprising a pair of opposed spring-supported brace members and rocking supports therefor and through which said members are slidable.

3. The combination with a vehicle axle, of steering knuckles turnable thereon, arms rigid with the knuckles, a rod pivotally connecting them, an arm pivotally supported on the axle between said rigid arms, pivotal connections between said pivoted arm and said connecting rod, and means acting on the pivoted arm to maintain it normally at right angles to the axle, said last-named means comprising a pair of opposed spring-supported brace members, said brace members sliding in pivoted trunnions.

4. The combination of suitably supported steering knuckles, arms rigid therewith, a rod pivotally connecting said arms, a suitably supported pivoted arm having a pivotal connection with said rod between said rigid arms, and spring tension means acting on the pivoted arm to maintain the knuckles normally in alinement, said last-named means including a pivotally mounted support and a spring supported brace member slidably operating through said support.

5. The combination of a vehicle axle, knuckles pivoted thereon, arms rigid with the knuckles, a rod pivotally connecting said arms, a bracket removably carried by the axle, an arm pivoted to the bracket and pivotally connected to said connecting rod, and spring tension devices coacting with said pivoted arm and said bracket to maintain the spindles normally in line, said spring tension devices including a pair of opposed spring supported brace members and pivoted trunnions in which said members are slidably mounted.

6. The combination of a vehicle axle, knuckles pivoted thereon, arms rigid with the knuckles, a rod pivotally connecting said arms, a bracket removably carried by the axle, an arm pivoted to the bracket and pivotally connected to said connecting rod, and spring tension devices coacting with said pivoted arm and said bracket to maintain the spindles normally in line, said spring tension devices including a cylinder having trunnions upon which it is turnable, a sleeve threaded in said cylinder, a rod sliding in the sleeve and pivoted to said pivoted arm, and a spring surrounding the rod.

7. The combination of a vehicle axle, knuckles pivoted thereon, arms rigid with the knuckles, a rod pivotally connecting said arms, a bracket removably carried by the axle, an adjustable arm pivoted to the bracket and pivotally connected to said connecting rod, and spring tension devices coacting with said pivoted arm and said bracket to maintain the spindles normally in line, and said tensioning devices including rods pivoted to opposite sides of said pivoted arm and sliding in suitable trunnion members on the bracket, and oppositely acting springs on said rods.

In testimony whereof I have hereunto set my hand in the presence of two subscribing witnesses.

HENRY P. LAROUETTE.

Witnesses:
EDWIN A. WILCOX,
GEORGE E. B. WILLES.